(12) United States Patent
Taguchi et al.

(10) Patent No.: US 9,595,853 B2
(45) Date of Patent: Mar. 14, 2017

(54) ELECTRIC COMPRESSOR

(71) Applicant: SANDEN CORPORATION, Isesaki-shi (JP)

(72) Inventors: Masanori Taguchi, Isesaki (JP); Takehiro Hasegawa, Isesaki (JP); Shigeyuki Koyama, Isesaki (JP)

(73) Assignee: SANDEN HOLDINGS CORPORATION, Isesaki-shi (JP)

( * ) Notice: Subject to any disclaimer, the term of this patent is extended or adjusted under 35 U.S.C. 154(b) by 407 days.

(21) Appl. No.: 14/373,558

(22) PCT Filed: Jan. 9, 2013

(86) PCT No.: PCT/JP2013/050151
§ 371 (c)(1),
(2) Date: Jul. 21, 2014

(87) PCT Pub. No.: WO2013/108675
PCT Pub. Date: Jul. 25, 2013

(65) Prior Publication Data
US 2014/0375157 A1 Dec. 25, 2014

(30) Foreign Application Priority Data
Jan. 20, 2012 (JP) ................................ 2012-009835

(51) Int. Cl.
H02K 11/00 (2016.01)
H02K 3/44 (2006.01)
(Continued)

(52) U.S. Cl.
CPC ............... H02K 3/44 (2013.01); F04B 35/04 (2013.01); F04B 39/00 (2013.01); H02K 5/12 (2013.01);
(Continued)

(58) Field of Classification Search
CPC ......... H02K 3/44; H02K 11/0094; H02K 5/12
(Continued)

(56) References Cited

U.S. PATENT DOCUMENTS 6,548,924 B2 * 4/2003 Furukawa ............... F04B 35/04
310/68 C
7,056,104 B2 * 6/2006 Kimura ............... F04C 18/0215
310/71
(Continued)

FOREIGN PATENT DOCUMENTS

JP 2007-64045 3/2007
JP 2009-8009 1/2009
(Continued)

Primary Examiner — Thanh Lam
(74) Attorney, Agent, or Firm — Cozen O'Connor

(57) ABSTRACT

An electric compressor which compresses a coolant by driving a compression mechanism with a motor which is drive controlled by a drive circuit, said compressor being characterized by having a lead pin connected to a current output section of the drive circuit, and a connector which, by being mounted on the lead pin, can provide electrical continuity between the current output section of the drive circuit and a current input section of the motor, said connector being provided with a connector terminal which contacts the lead pin at the time of mounting on the lead pin, a connector housing which houses the connector terminal, a vacuum flow path that communicates the inside of the connector housing with the outside thereof, and a sealing member which provides a seal between the connector housing and the vacuum flow path. Thus, provided is a compressor which is easy to produce and for which it is possible to secure the electrical insulation properties of the interior of the compressor while homogenizing the internal pressure thereof.

6 Claims, 5 Drawing Sheets

(51) Int. Cl.
  *F04B 35/04* (2006.01)
  *F04B 39/00* (2006.01)
  *H02K 5/12* (2006.01)
  *F04C 18/02* (2006.01)

(52) U.S. Cl.
  CPC ...... *H02K 11/0094* (2013.01); *F04C 18/0215* (2013.01); *F04C 2240/803* (2013.01); *F04C 2240/808* (2013.01)

(58) Field of Classification Search
  USPC .................................................. 310/71, 52–59
  See application file for complete search history.

(56) References Cited

U.S. PATENT DOCUMENTS

| | | | |
|---|---|---|---|
| 2003/0184167 A1* | 10/2003 | Ioi | H02K 3/44 310/52 |
| 2007/0048151 A1 | 3/2007 | Sakai et al. | |
| 2008/0012438 A1* | 1/2008 | Hong | F04B 17/03 310/71 |
| 2009/0304536 A1 | 12/2009 | Egawa et al. | |
| 2011/0058973 A1 | 3/2011 | Yamada et al. | |

FOREIGN PATENT DOCUMENTS

| | | |
|---|---|---|
| JP | 2009-293598 | 12/2009 |
| JP | 2011-58388 | 3/2011 |

\* cited by examiner

ELECTRIC COMPRESSOR

RELATED APPLICATIONS

This is a U.S. National stage of International application No. PCT/JP2013/050151 filed on Jan. 9, 2013.

This patent application claims the priority of Japanese application no. 2012-009835 filed Jan. 20, 2012, the disclosure content of which is hereby incorporated by reference.

TECHNICAL FIELD OF THE INVENTION

The present invention relates to an electric compressor having a motor controlled with a drive circuit such as inverter.

BACKGROUND ART OF THE INVENTION

An electric compressor mounted on vehicles or the like is provided with an airtight terminal section having connector terminals at which an electric current output from an inverter is input through lead pins (current-carrying part) of a hermetic plate to a motor winding. In such a case, the connector terminals are generally fixed to the hermetic plate with a cluster housing which houses a plurality of connector terminals.

The airtight terminal section is designed to be inside a compressor housing (sealed container) to form a compact electric compressor. When refrigerant as a fluid to be compressed is flowing in the compressor housing, a pressure difference might be generated between the inside and outside of the airtight terminal if the airtight terminal section is completely sealed and closed off to prevent liquid refrigerant from flowing in the airtight terminal section. Therefore, there have been some attempts to provide through holes to allow the liquid refrigerant to flow both inside and outside the airtight terminal section.

However, such through holes connecting the sealed container and the airtight terminal section in the compressor might allow the liquid refrigerant to enter the airtight terminal section through the through holes, so that the sealed container tends to have insufficient insulation inside. To prevent such insufficient insulation, Patent document 1 discloses an insulation distance extension section is provided to ensure the insulation property.

PRIOR ART DOCUMENTS

Patent Documents

Patent document 1: JP2009-293598-A

SUMMARY OF THE INVENTION

Problems to be Solved by the Invention

The insulation distance extension section installed in an electric compressor disclosed in Patent document 1 has a rather complicated structure unsuitable for miniaturization. In addition, the insulation distance extension section might complicate the processing of component members as well as the assembling of compressors, in manufacturing compressors.

Accordingly, it could be helpful to provide an electric compressor which is easily manufactured and has sufficient insulation as well as uniform pressure inside the compressor.

Means for Solving the Problems

To achieve the above-described object, the present invention is an electric compressor which compresses a refrigerant by driving a compression mechanism with a motor which is controlled to drive with a drive circuit, characterized to comprise a lead pin connected to an electric current output section of the drive circuit and a connector to be attached to the lead pin to electrically connect the electric current output section with an electric current input section of the motor, the connector comprising a connector terminal which contacts the lead pin to attach the connector to the lead pin, a connector housing which houses the connector terminal, a vacuum flow path which communicates an inside with an outside of the connector housing, and a sealing member which provides a seal between the connector housing and the vacuum flow path.

In such an electric compressor, the sealing member provides the seal between the connector housing and the vacuum flow path communicating the inside of the connector housing with the outside thereof, so that a conductive path is generated only in the vacuum flow path even if liquid refrigerant flows in the connector housing. As a result, both of uniform pressure and insulation are secured in the compressor.

In the electric compressor, it is preferable that an electric insulator is interposed between the connector housing and the lead pin. Such an electric insulator could prevent the lead pin connected to the drive circuit side of the connector housing from leaking electric current.

It is preferable that the sealing member is made of an electric insulator. For example, the sealing member made of insulative rubber material could effectively ensure insulation of the connector housing. It is possible that the electric insulator interposed between the connector housing and the lead pin is made of a material different from the sealing member. If both of them are made of the same material, material cost increase can be suppressed.

In the electric compressor, it is preferable that the vacuum flow path is formed with a gap of a conducting wire bundle which electrically communicates the connector terminal with an electric current input section of the motor. Such a gap of the conducting wire bundle to form the vacuum flow path could minimize a section area of the liquid refrigerant flowing into the connector housing. Specifically, a refined vacuum flow path is easily formed by leading several bared motor windings having large diameters into the connector terminal.

The present invention could be effective if the connector housing is a cluster housing which houses a plurality of connector terminals. The present invention can be applied to an electric compressor having a cluster housing, so that insulation of the airtight terminal section integrated together is effectively ensured.

It is preferable that the present invention is applied to an electric compressor to be lubricated inside with a polyalkylene-based lubricating oil (PAG oil). In such a case, the present invention could specifically be helpful because the connector housing tends to have an insulation failure if the lubricating oil is PAG oil which is less insulative than a polyol ester-based lubricating oil (POE oil).

Effect According to the Invention

The present invention makes it possible that electric insulation property is prevented from deteriorating even if refrigerant or lubricating oil flows in the connector housing, so as to provide an electric compressor which is ensured to have sufficient electric insulation property even in a case that the PAG oil is used as a lubricating oil or that a higher voltage is applied to operate the compressor.

EMBODIMENTS FOR CARRYING OUT THE INVENTION

Hereinafter, desirable examples of the present invention will be explained with reference to figures.

Figure 1:
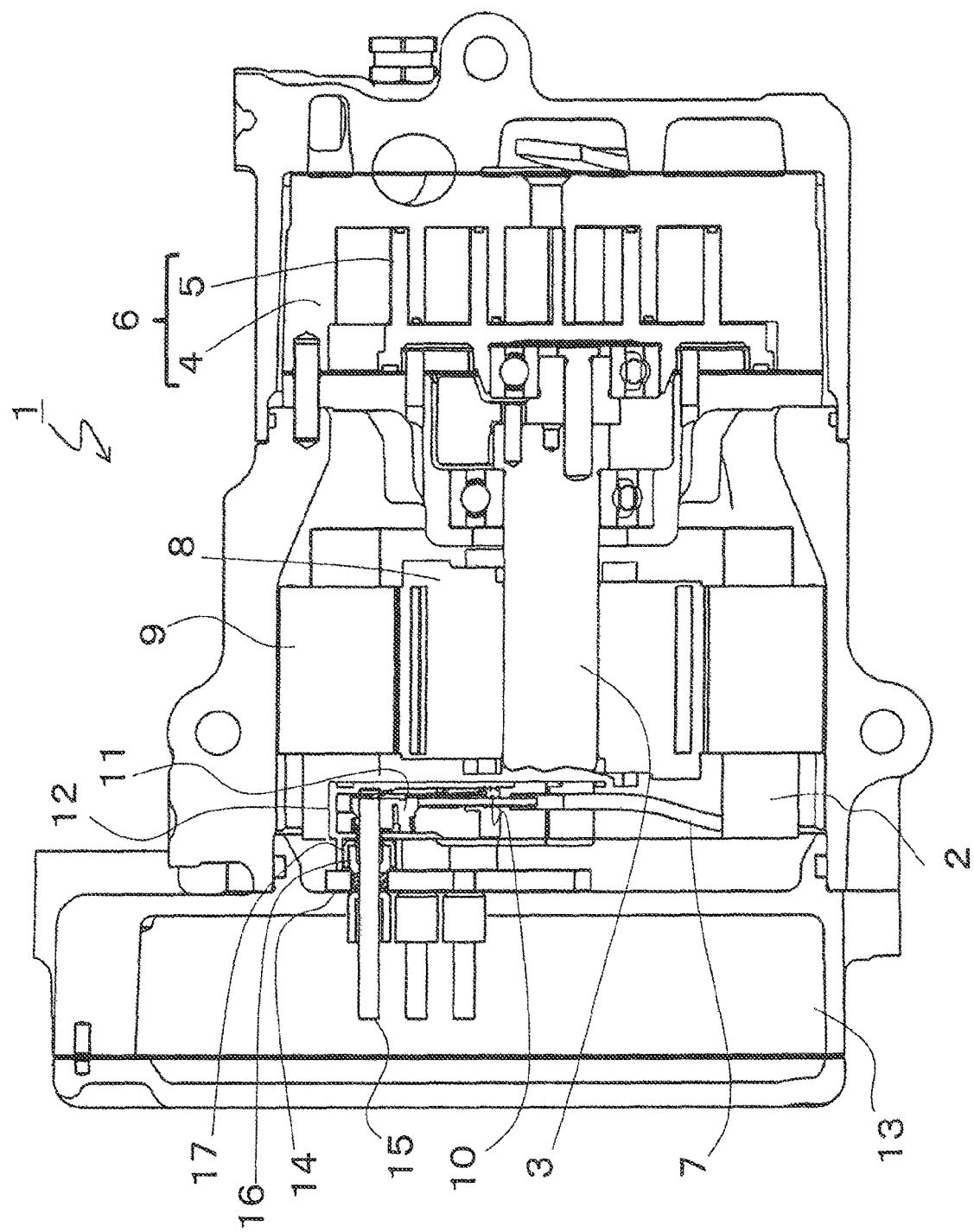
FIG. 1 is a schematic longitudinal section view showing an electric compressor according to the present invention.

FIG. 1 is a longitudinal section view showing electric compressor 1 according to the present invention, Main shaft 3 driven to rotate by motor 2 makes movable scroll 4 swing so that refrigerant is compressed in compression mechanism 6 consisting of movable scroll 4 and fixed scroll 5. Electric current input to motor 2 through motor conducting wire 7 generates magnetic field to rotate rotor 8 driving main shaft 3 to rotate around stator 9.

Motor conducting wire 7, which has been made by coating several bared motor windings as leaving the tip uncoated, is connected to connector terminal 11 via vacuum flow path 10 formed with gaps of conducting wire at the exposed tip. Refrigerant and lubricating oil flowing inside electric compressor 1 can flow via vacuum flow path 10 into connector housing 12 which houses connector terminal 11.

Connector terminal 11 connects to lead pin 15 on hermetic plate 14 provided in the electric current output section of inverter 13 as a drive circuit, for driving motor 2. Connector housing 12 is configured to be attached to annular insulators 16 around lead pins 15 near hermetic plate 14. The attaching part is sealed with sealing members 17 made of rubber as an electric insulator interposed between connector housing 12 and lead pins 15.

Figure 2:
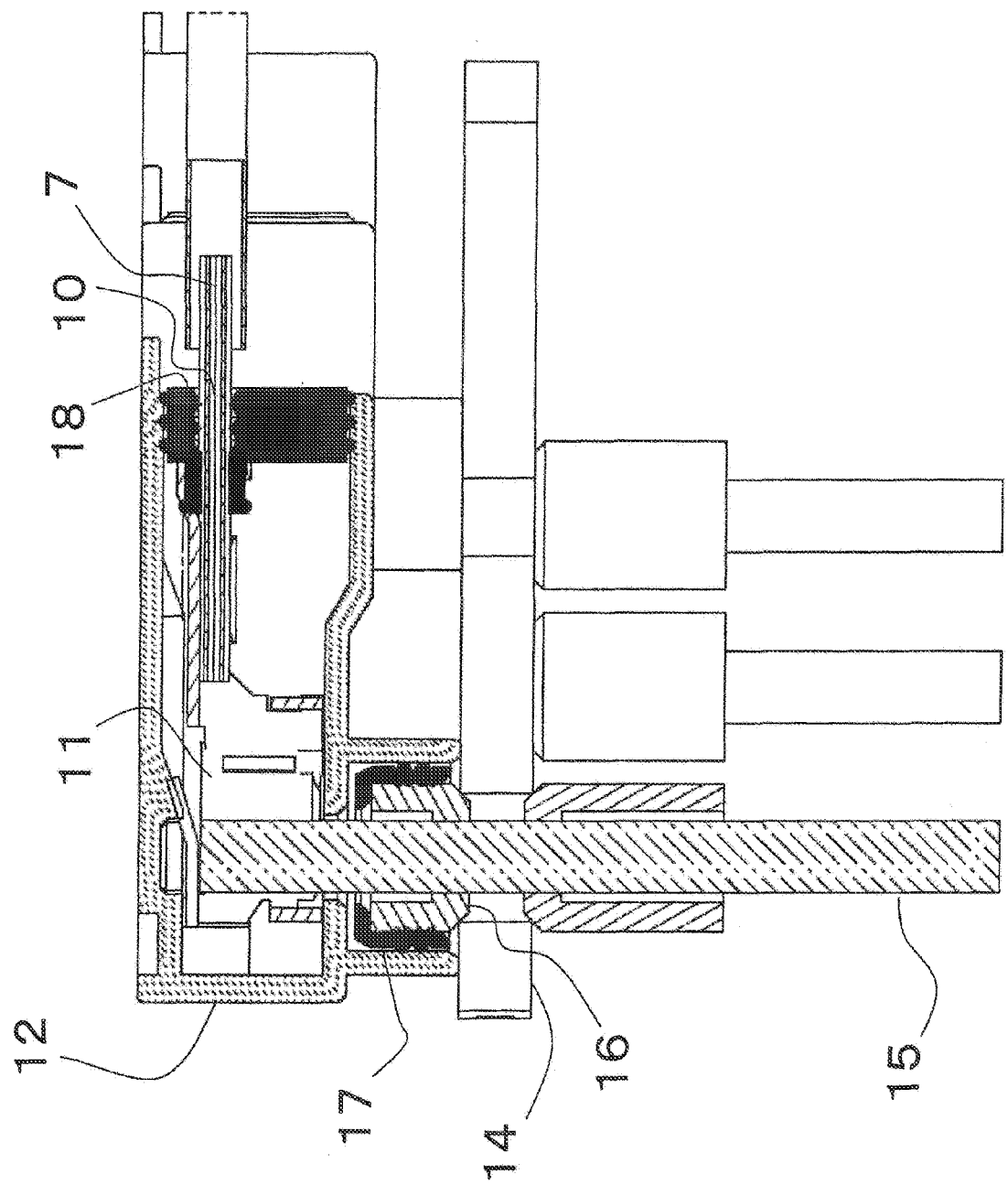
FIG. 2 is a partial enlarged longitudinal section view showing a neighborhood of a connector terminal of the electric compressor shown in FIG. 1.

FIG. 2 is a partial enlarged longitudinal section view showing a neighborhood of connector terminal 11 composing electric compressor 1 in FIG. 1. Because vacuum flow path 10 which has been formed as gaps in a conducting wire bundle at a tip of motor conducting wire 7 connects the inside and outside of connector housing 12, refrigerant and lubricating oil introduced in the system of electric compressor 1 can flow in connector housing 12 through vacuum flow path 10, When vacuum is produced to start the operation of electric compressor 1 by introducing refrigerant in the system, vacuum is produced even inside connector housing 12 through vacuum flow path 10. Then the refrigerant is introduced into the system, so that the refrigerant and lubricating oil flow in connector housing 12 through vacuum flow path 10. In this example, since sealing member 18 made of rubber as an electric insulator is interposed between vacuum flow path 10 and connector housing 12, the refrigerant and lubricating oil flow only through vacuum flow path 10 into connector housing 12 as preventing them from flowing into connector housing through any other paths. In this way, inner pressure of electric compressor 1 is made uniform while electric insulation is sufficiently secured around connector terminals 11.

Figure 3:
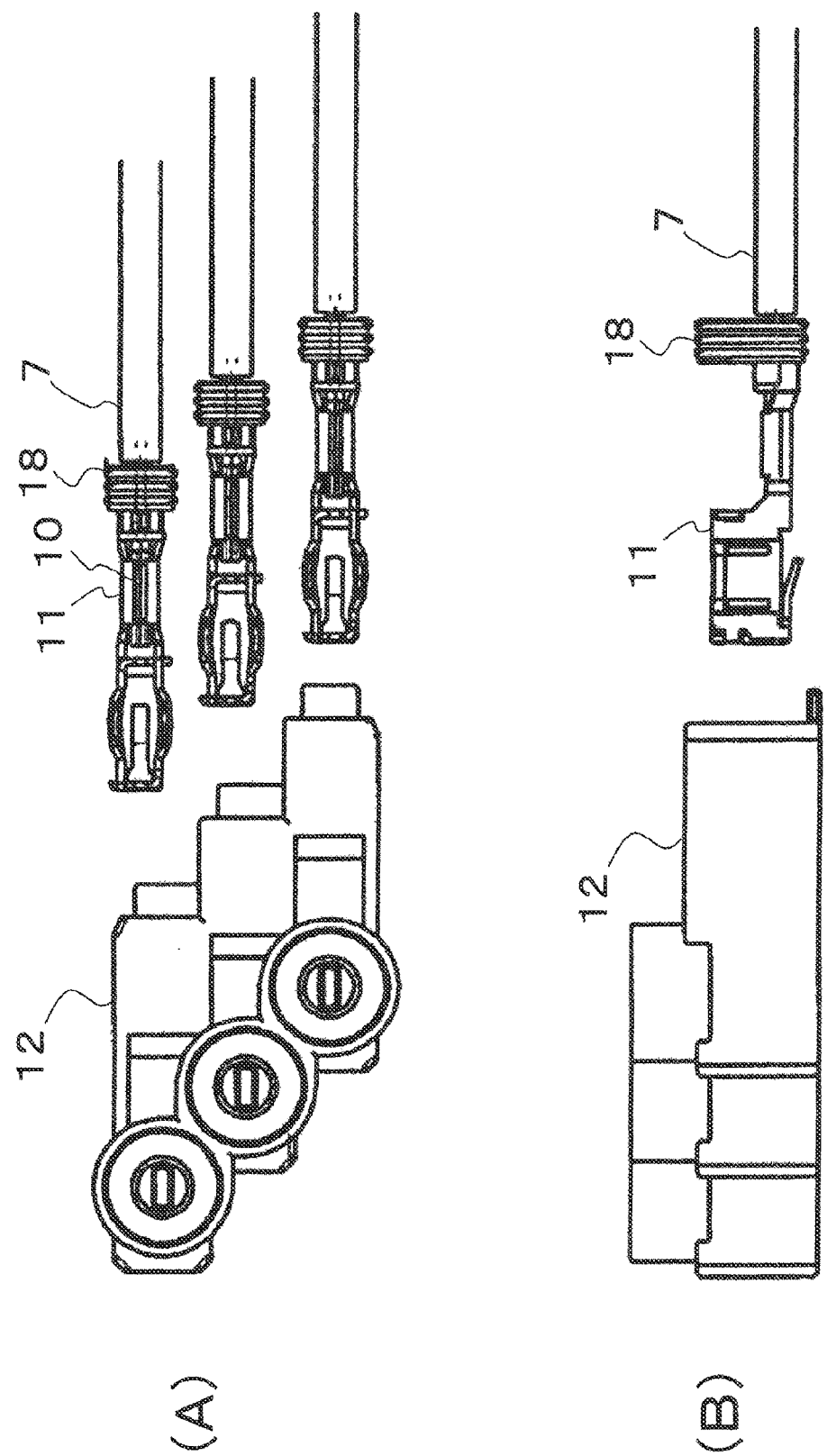
FIG. 3 shows the connector housing and connector terminals composing the electric compressor shown in FIG. 1, where (A) is a plan view and (B) is an elevation view.

FIG. 3 shows connector housing 12 and connector terminal 11 composing electric compressor 1 in FIG. 1. (A) is a plan view and (B) is an elevation view. In this example, connector housing 12 has a so-called cluster housing shape and comprises a plurality of housing sections to house a plurality of connector terminals.

Figure 4:
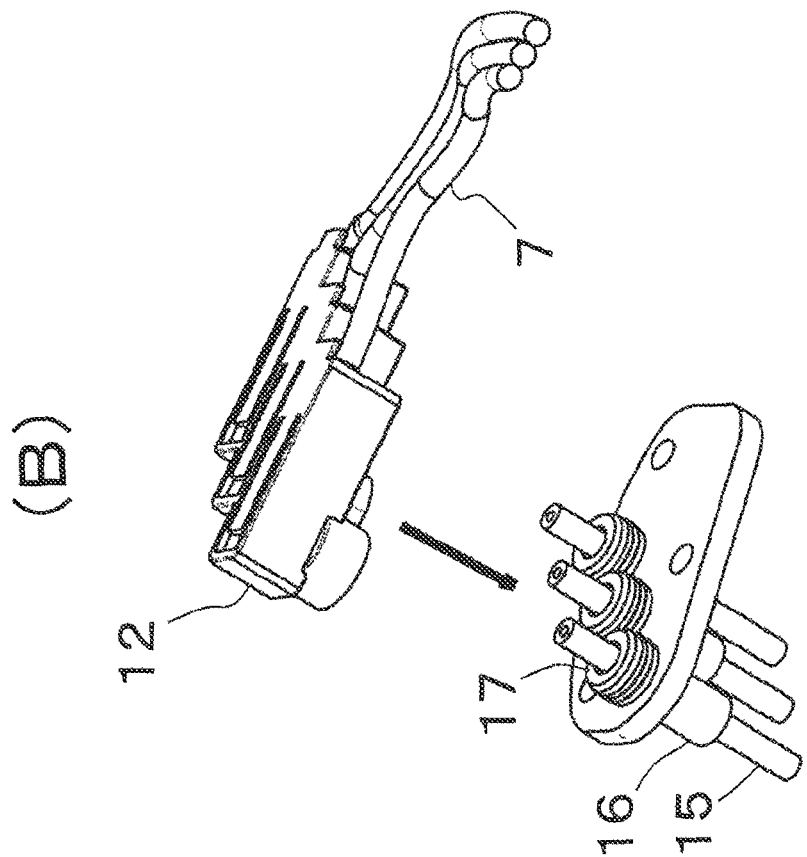
FIG. 4 shows operations for mounting the connector housing composing the electric compressor shown in FIG. 1, where (A) is a perspective view for explaining a mounting operation of a sealing member and (B) is a perspective view for explaining a mounting operation of a plate.
Figure 4:
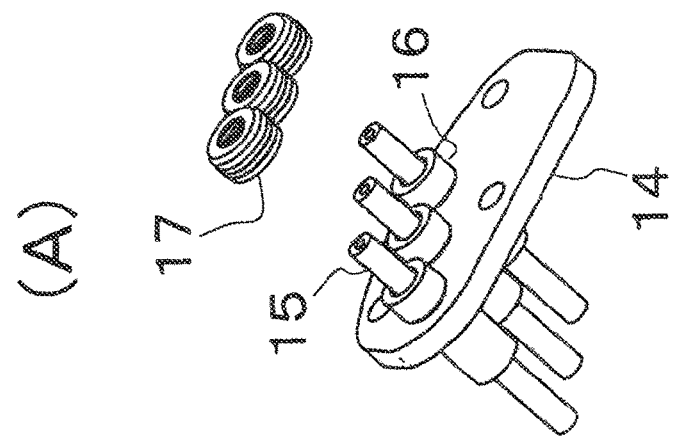

FIG. 4 shows operations for mounting connector housing 12 composing electric compressor 1 in FIG. 1. (A) is a perspective view for explaining a mounting operation of sealing member 17 onto hermetic plate 14. (B) is a perspective view for explaining a mounting operation of connector housing 12 onto hermetic plate 14. Annular insulator 16 provided around lead pins 15 and annular sealing members 17 fitted in insulator 16 are interposed between lead pins 15 and connector housing 12. Thus electric insulation is secured in such a configuration that the attaching part of connector housing 12 is tightly sealed with electric insulator only.

Figure 5:
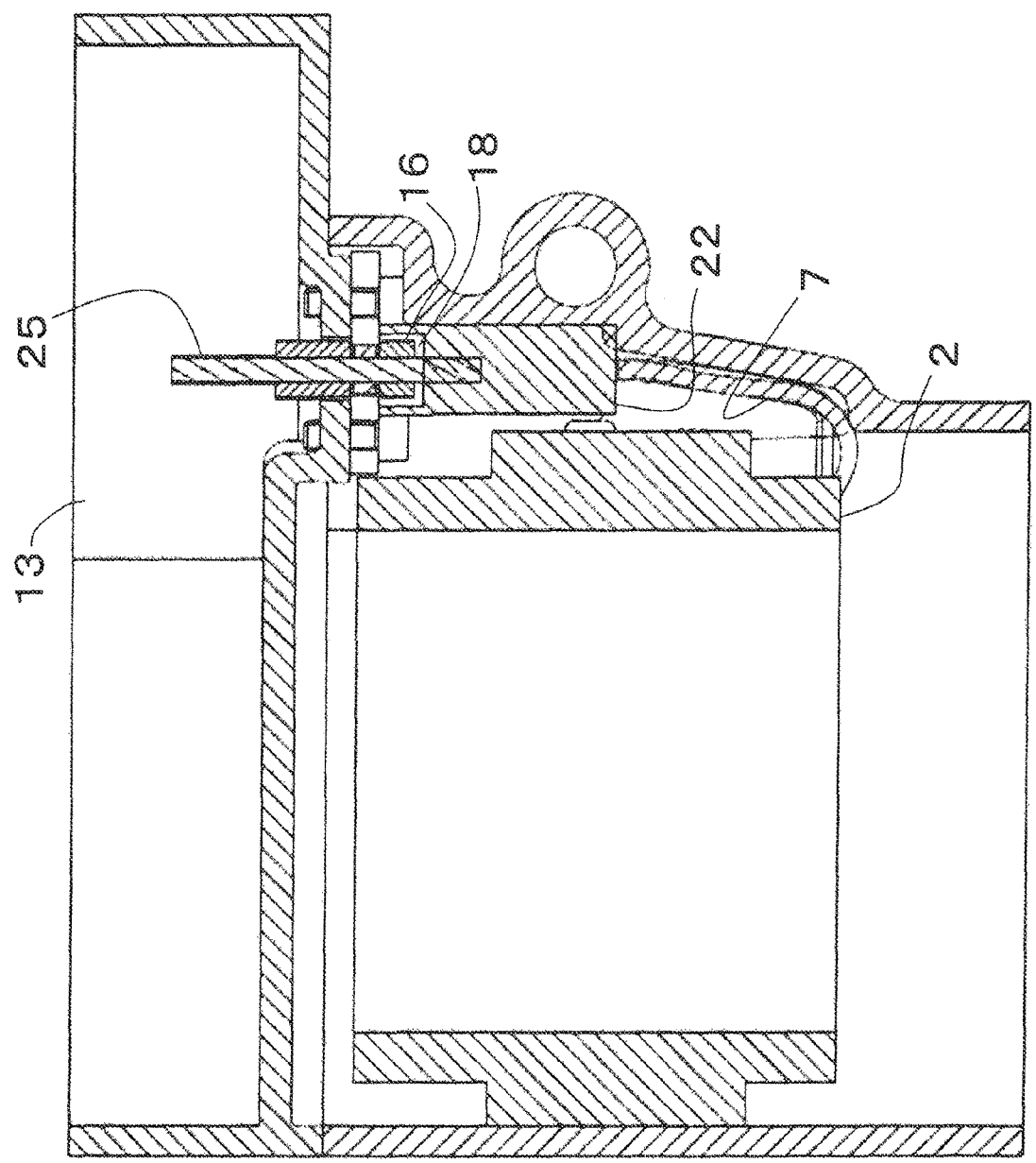
FIG. 5 is a partial enlarged longitudinal section view showing a neighborhood of a connector terminal of another electric compressor according to the present invention.

FIG. 5 is a partial enlarged longitudinal section view showing a neighborhood of a connector terminal in electric compressor 21 as another example according to the present invention. Connector housing 22 houses a connector terminal and vacuum flow path, which are not shown. This example is configured to have a parallel layout consisting of longitudinally aligned lead pins 25 and the vacuum flow path. The parallel layout of this example is different from the orthogonal layout consisting of orthogonally-oriented lead pins 15 and vacuum flow path 10 in FIG. 2. Since the other points are the same as FIG. 2, detailed explanations are omitted by giving the same component number to the corresponding component.

INDUSTRIAL APPLICATIONS OF THE INVENTION

An electric compressor according to the present invention is applicable to a scroll type electric compressor to be mounted in electric automobiles or the like.

EXPLANATION OF SYMBOLS 1, 21: electric compressor
2: motor
3: main shaft
4: movable scroll
5: fixed scroll
6: compression mechanism
7: motor conducting wire
8: rotor
9: stator
10: vacuum flow path
11: connector terminal
12, 22: connector housing
13: inverter
14: hermetic plate
15, 25: lead pin
16: insulator
17, 18: seal member

The invention claimed is:

1. An electric compressor which compresses a refrigerant by driving a compression mechanism with a motor which is controlled to drive with a drive circuit, a lead pin connected to an electric current output section of the drive circuit, and a connector attached to the lead pin to electrically connect the electric current output section with an electric current input section of the motor, wherein the connector comprises a connector terminal which contacts the lead pin to attach the connector to the lead pin, a connector housing which houses the connector terminal, a vacuum flow path which communicates an inside with an outside of the connector housing, and a sealing member which provides a seal between the connector housing and the vacuum flow path.

2. The electric compressor according to claim 1, wherein an electric insulator is interposed between the connector housing and the lead pin.

3. The electric compressor according to claim 1, wherein the sealing member is made of an electric insulator.

4. The electric compressor according to claim 1, wherein the vacuum flow path is formed with a gap of a conducting wire bundle which electrically communicates the connector terminal with an electric current input section of the motor.

5. The electric compressor according to claim 1, wherein the connector housing is a cluster housing which houses a plurality of connector terminals.

6. The electric compressor according to claim 1, wherein the electric compressor having an interior that is lubricated with a polyalkylene-based lubricating oil.

* * * * *